(12) United States Patent
Pehkonen

(10) Patent No.: US 6,332,005 B1
(45) Date of Patent: Dec. 18, 2001

(54) METHOD FOR CONVERTING A SIGNAL DATA RATE, AND A TRANSMITTER

(75) Inventor: Kari Pehkonen, Oulu (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/177,246

(22) Filed: Oct. 22, 1998

(30) Foreign Application Priority Data

Oct. 24, 1997 (FI) .................................................... 974052

(51) Int. Cl.[7] .................................................. H04L 27/01
(52) U.S. Cl. .......................... 375/259; 375/225; 375/240
(58) Field of Search .................................. 375/259, 225, 375/240; 370/235, 468, 540, 543, 545; 714/779, 79 D

(56) References Cited

U.S. PATENT DOCUMENTS

| | | | |
|---|---|---|---|
| 5,170,396 | 12/1992 | Rivers et al. ............................ | 371/6 |
| 5,327,439 | 7/1994 | Estola et al. ........................... | 371/43 |
| 5,396,653 | 3/1995 | Kivari et al. ............................ | 455/88 |
| 5,420,889 | 5/1995 | Juntti ..................................... | 375/346 |
| 5,430,740 | 7/1995 | Kivari et al. ......................... | 371/37.1 |
| 5,784,392 | 7/1998 | Czaja et al. .......................... | 371/43.1 |
| 5,796,757 | 8/1998 | Czaja ...................................... | 371/46 |
| 5,883,923 | * 3/1999 | Shimazaki ............................ | 375/225 |
| 6,038,253 | * 3/2000 | Shimazaki ............................ | 375/224 |
| 6,137,779 | * 10/2000 | Miller et al. ......................... | 370/236 |

FOREIGN PATENT DOCUMENTS

WO 95/12943  5/1995 (WO) .

OTHER PUBLICATIONS

Japanese Patent Abstract No.: 09018449 A.
Japanese Patent Abstract No.: 09018450 A.
Finnish Office Action.

* cited by examiner

*Primary Examiner*—Stephen Chin
*Assistant Examiner*—Mohammad Ghayour
(74) *Attorney, Agent, or Firm*—Perman & Green, LLP

(57) ABSTRACT

The invention relates to a method for converting a signal data rate and to a transmitter in a digital data transmission system, the transmitter comprising a number of data sources that generate a signal having a first data rate, and a coder for forming the signal into frames of a given length, which length corresponds to a second data rate, and a coder for grouping the signal into a first block the length of which corresponds to the first data rate. In order to convert the data rate flexibly, the transmitter comprises a coder, which calculates the difference between the frame and the number of symbols in the first block by subtracting the frame length from the number of symbols in the first block, which equalizes the difference by removing or repeating every ith symbol in the first block, i being determined as the nearest bigger or an equal integer when the number of symbols in the first block is divided by the absolute value of the difference that was calculated, which updates the number of the symbols that do not fit in the frame by subtracting therefrom the number of the symbols that have been repeated, and which forms the first block to consist of the symbols that have not been repeated or removed.

17 Claims, 3 Drawing Sheets

METHOD FOR CONVERTING A SIGNAL DATA RATE, AND A TRANSMITTER

FIELD OF THE INVENTION

The invention relates to a method for converting a signal data rate from a lower data rate to a higher data rate in a digital data transmission system, wherein a signal is transmitted by using frames of a given length, which length corresponds to the higher data rate, in which method the signal is grouped to a first block the length of which corresponds to the lower data rate, and wherein symbols to be transmitted are subjected to repetition coding.

The invention also relates to a method for converting a signal data rate from a higher data rate to a lower data rate in a digital data transmission system, wherein a signal is transmitted by using frames of a given length, which length corresponds to the lower data rate, in which method the signal is grouped to a first block the length of which corresponds to the higher data rate, and wherein symbols to be transmitted are subjected to removal coding.

BACKGROUND OF THE INVENTION

The requirements set for data transmission systems continue to increase. This concerns especially wireless data transmission systems, such as cellular radio systems, which are required to provide more and more varied services, including different data and video services.

Traditionally, wireless data transmission systems have been used to transmit only speech. The increasing number of different services to be transmitted means especially in wireless systems that a system must be able to transmit signals with different capacities over the radio path, for example to transmit speech at the data rate of 8 kbps and data at the rate of 64 kbps. It is also necessary to transmit signals with different quality levels, which typically require different data rates simultaneously. A typical example is a video connection where the image requires a high data rate and a high quality level, but the voice can be transmitted at a lower data rate and with a lower quality level. Therefore, a data transmission system should be able to operate effectively in an environment where transmissions of several different data rates, quality levels and service types are forwarded.

It is typical of digital data transmission systems that signals are transmitted in frames and that the size of a frame is predetermined. When different data rates are used, it is not always possible to select for all data rates a frame which is exactly of the correct size and which has space for the symbols to be transmitted, but it is necessary to change the data rate so that the information to be transmitted can be forwarded in the available frames.

A data rate can be either increased or decreased, as required. The best known and the simplest method of increasing the data rate is repetition coding, wherein user data symbols are repeated as many times as there are free symbol positions in the frame. Correspondingly, the data rate is decreased in the simplest manner by removing user data symbols until the remaining symbols fit in the available frame. The problem in the prior art arrangement is how to select the symbols to be repeated or removed so that they are distributed evenly among the symbols to be transmitted.

BRIEF DESCRIPTION OF THE INVENTION

The object of the present invention is to implement the method such that the aforementioned problems can be solved. This is achieved with a method of the type described in the preamble, characterized in that the method comprises the steps of D1) calculating the number of symbols missing from the frame by subtracting from the frame length the number of symbols in the first block, and if the number of the missing symbols is greater than one, E1) repeating every ith symbol in the first block, i being determined as the nearest bigger or an equal integer when the number of symbols in the first block is divided by the number of symbols missing from the frame, F1) updating the first block by removing therefrom the symbols that have been repeated, G1) updating the number of symbols missing from the frame by subtracting therefrom the number of the symbols that have been repeated, and if the number of the missing symbols is greater than one, H1) proceeding to step E1).

The method according to the invention is also characterized in that the method comprises the steps of D2) calculating the number of symbols that do not fit in the frame by subtracting the frame length from the number of symbols in the first block, and if the calculated number of symbols is greater than one, E2) removing every ith symbol from the first block, i being determined as the nearest bigger or an equal integer when the number of symbols in the first block is divided by the number of symbols that do not fit in the frame, F2) forming the first block to consist of the symbols that have not been removed, G2) updating the number of symbols that do not fit in the frame by subtracting therefrom the number of the repeated symbols, and if the number of the missing symbols is greater than one, H2) proceeding to step E2).

The invention also relates to a transmitter in a digital data transmission system, comprising means for generating a signal having a first data rate, and means for forming the signal in frames of a given length that corresponds to a second data rate, and means for grouping the signal in a first block the length of which corresponds to the first data rate. The transmitter according to the invention is characterized in that the transmitter comprises means for calculating the difference between the frame and the number of symbols in the first block by subtracting the frame length from the number of symbols in the first block, means for equalizing the difference by removing or repeating every ith symbol in the first block, i being determined as the nearest bigger or an equal integer when the number of symbols in the first block is divided by the absolute value of the difference that was calculated, means for updating the number of symbols that do not fit in the frame by subtracting therefrom the number of the symbols that have been repeated, and means for forming the first block to consist of the symbols that have not been repeated or removed.

The preferred embodiments of the invention are disclosed in the dependent claims.

The method and the transmitter according to the invention provide several advantages. By means of the method according to the invention, the symbols to be repeated or removed can be selected as evenly as possible from among the symbols to be transmitted. In this manner the quality of the coding is the best possible. The method according to the invention enables flexible rate adaptation between data rates of different types. On the other hand, the method according to the invention enables unambiguous repetition or removal, so that it is possible to deduce the repeated symbols at the receiving end if the algorithm is known.

BRIEF DESCRIPTION OF THE DRAWINGS

The invention will be described in greater detail in connection with the preferred embodiments and with reference to the accompanying drawings, in which.

DETAILED DESCRIPTION OF THE INVENTION

Figure 1:
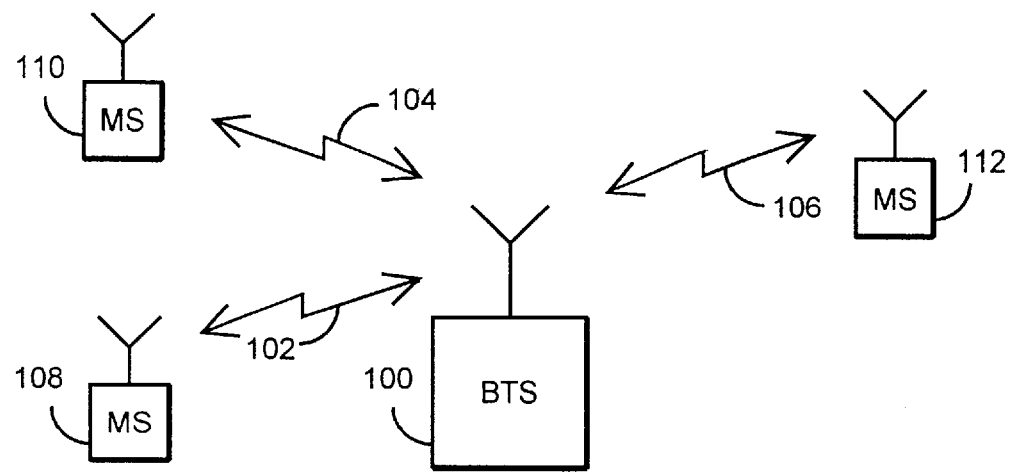
FIG. 1 shows an example of a wireless data transmission system where the method according to the invention can be applied.

FIG. 1 illustrates a digital data transmission system where the arrangement according to the invention can be applied. This system is a part of a cellular radio system comprising a base station 100 that communicates via a bidirectional connection 102 to 106 with subscriber terminals 108 to 112. The digital data transmission system used as an example is a cellular radio system, and the invention will be described in the following when it is applied in a cellular radio system but without restricting the invention thereto, as it is evident for a person skilled in the art. The invention is also applicable in other systems.

Figure 2:
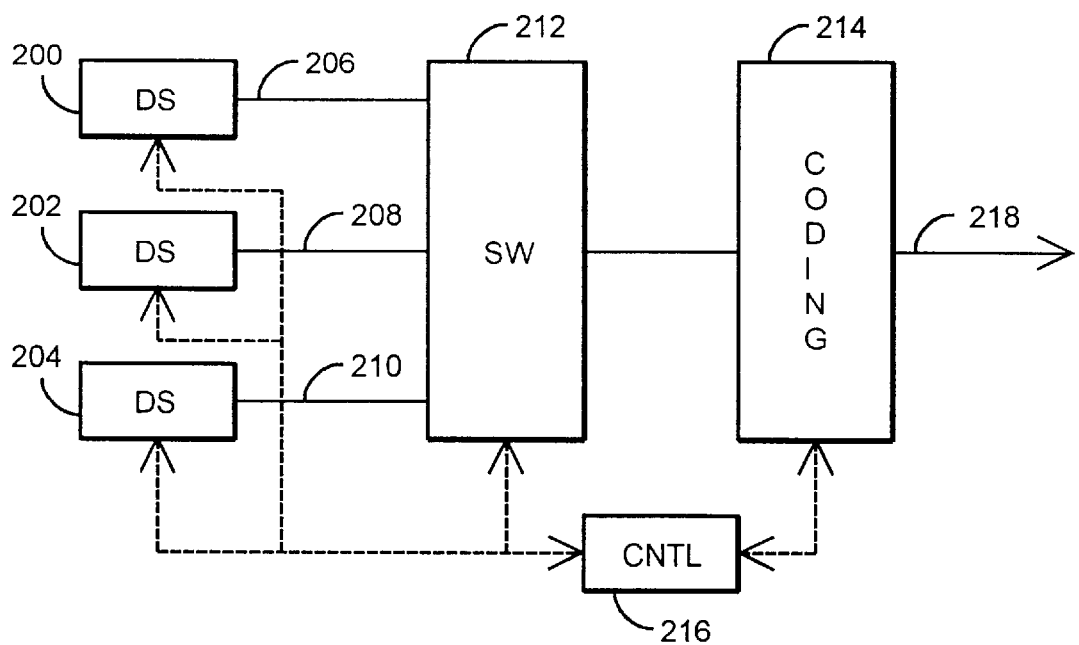
FIG. 2 is a block diagram illustrating a possible structure of a transmitter implementing the arrangement according to the invention.

Assume that in the system the terminal equipments can transmit information at several different data rates depending on the data transmission capacity required. FIG. 2 is a block diagram illustrating a possible structure of a transmitter implementing the arrangement according to the invention. The transmitter comprises a number of data sources 200 to 204, which may be provided for example for speech transmission or different data services. In the data sources, the information is subjected to channel coding. Signals 206 to 210 from the data sources are in the form of frames and their data rates differ from one another. The transmitter further comprises a switch or a multiplexer 212, which selects or combines the signal from the active data source(s) to coding means 214. Control means 216 control the operation of the switch or the multiplexer 212 and the other parts of the transmitter. The control and coding means 214, 216 are implemented most preferably with a processor by means of software. A signal 218 supplied from the coding means 214 is in the form of a frame. In the coding means 214, the data rates of the signals from the data sources are adapted to the frame by using either repetition or removal coding by means of the arrangement according to the invention. It should be noted that the transmitter of FIG. 2 only comprises components that are essential for describing the invention. An actual transmitter also comprises other parts, such as filters and amplifiers, that are evident for a person skilled in the art, but they are not described herein for the sake of clarity.

Figure 3A:
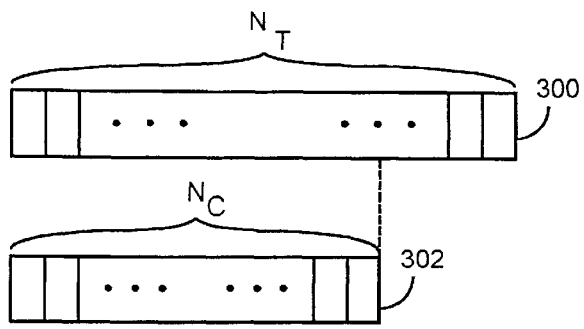
FIGS. 3a to 3d illustrate the arrangement according to the invention by means of different frame alternatives.
Figure 3B:
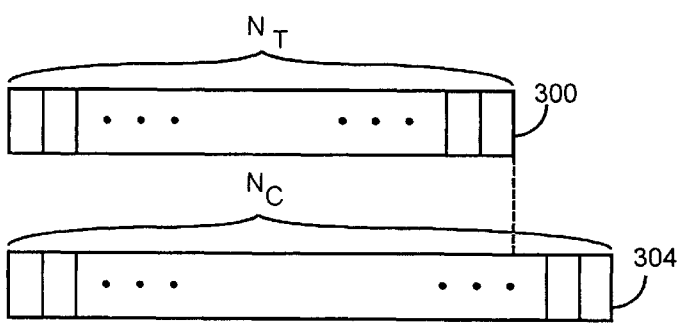

FIGS. 3a to 3d illustrate the arrangement according to the invention by means of different frame alternatives. The purpose is to convert the data rate of the signal to be transmitted into a data rate that is suitable for the length of the available frame. The number of symbols that fit in the frame is denoted by $N_T$ and the number of symbols in the signal to be transmitted after the channel coding is denoted by $N_C$. FIG. 3a shows a data frame 300 of a channel, and a frame 302 of a data source. In the example of FIG. 3a, the channel data rate $N_T$ is higher than the information data rate $N_C$. This requires the implementation of repetition coding so that the channel frame can be filled with symbols. FIG. 3b shows the data frame 300 of the channel and the frame 304 of the data source. In the example of FIG. 3b, the channel data rate $N_T$ is lower than the information data rate $N_C$. This requires the implementation of removal coding or puncturing so that the information could be transmitted in the desired frame.

Examine the arrangement according to the invention in case of repetition coding, i.e. in the situation shown in FIG. 3a, where $N_T > N_C$. A first block $S_0 = \{d_1, d_2, \ldots, d_{ns}\}$ is formed of the $N_c$ symbols to be transmitted. Here $n_s$ is the number of symbols in the block $S_0$, and at the beginning of the procedure $n_s = N_c$. The purpose is to convert the lower data rate into a higher data rate by repeating $N_T - N_C$ symbols from the block $S_0$, such that after the repetition the block size is $N_T$ symbols. The repetitions are preferably distributed as evenly as possible in the frame to be transmitted.

The number of symbols y missing from the frame is calculated first by subtracting from the frame length $N_T$ the number of symbols $N_C$ in the first block. If the number of missing symbols is one, the first symbol in the block is repeated and the procedure is over. Otherwise term i is defined, such that $$i = \left\lceil \frac{n_s}{y} \right\rceil$$

wherein $n_s$ is the number of symbols in the block $S_0$. In other words, i is determined as the nearest bigger or an equal integer when the number of symbols in the first block is divided by the number of symbols missing from the frame. The first step of the repetition coding is carried out by repeating every ith symbol in the block $S_0$. The number $n_R$ of the repeated symbols is obtained by determining the nearest smaller or an equal integer when the number of symbols in the block is divided by i, i.e.

$$n_R = \left\lfloor \frac{n_s}{i} \right\rfloor.$$

The block $S_0$ is updated next by removing therefrom the symbols that have been repeated. After this, the number of symbols missing from the frame to be transmitted is updated by subtracting from it the number of the symbols that have been repeated, and the above-described procedure is repeated until all the symbol positions in the frame to be transmitted are in use.

Examine the arrangement according to the invention in case of removal coding or puncturing, i.e. in the situation shown in FIG. 3b, where $N_T < N_C$. A first block $S_0 = \{d_1, d_2, \ldots, d_{ns}\}$ is formed of the $N_C$ symbols to be transmitted. Here $n_s$ is the number of symbols in the block $S_0$, and at the beginning of the procedure $n_S = N_C$. The purpose is to convert the higher data rate into a lower data rate by removing $N_C - N_T$ symbols from the block $S_0$, such that after the removals the block size is $N_T$ symbols. The removals are preferably distributed as evenly as possible in the frame to be transmitted.

The number of symbols y that do not fit in the frame is calculated by subtracting the frame length $N_T$ from the number of symbols $N_C$ in the first block. If the number of symbols is one, the last symbol in the block is removed and the procedure is over. Otherwise term i is defined, such that $$i = \left\lceil \frac{n_s}{y} \right\rceil$$

wherein $n_S$ is the number of symbols in the block $S_0$. In other words, i is determined as the nearest bigger or an equal integer when the number of symbols in the first block is divided by the number of symbols that do not fit in the frame. The first step of the removal coding is carried out by removing every ith symbol in the block $S_0$. The number $n_R$ of the removed symbols is obtained by determining the nearest smaller or an equal integer when the number of symbols in the block is divided by i, i.e.

$$n_R = \left\lfloor \frac{n_s}{i} \right\rfloor.$$

The block $S_0$ is updated next to consist of the symbols that have not been removed. After this, the number of symbols that do not fit in the frame to be transmitted is updated by subtracting therefrom the number of the symbols that have been removed, and the above-described procedure is repeated until the symbols to be transmitted fit in the frame to be transmitted.

Figure 3C:
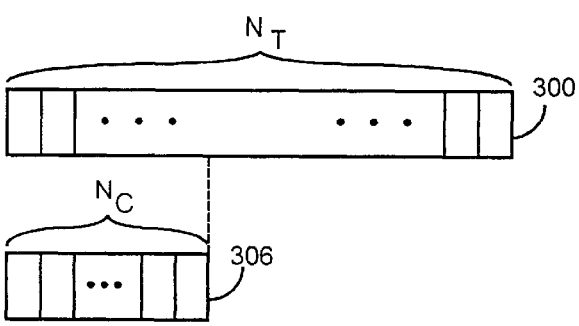

FIG. 3c shows a data frame 300 of the channel and a frame 306 of the data source. In the example shown in FIG. 3c, the channel data rate $N_T$ is higher than the information data rate $N_C$, such that $$\frac{N_T - N_C}{N_C} > 1,$$

i.e. the size of the frame to be transmitted is more than double the number of symbols in the information to be transmitted. In such a case, in the preferred embodiment of the invention each symbol to be transmitted is repeated a sufficient number of times and the first block $S_0$ is formed of this symbol group. After this, the procedure is as described above.

Figure 3D:
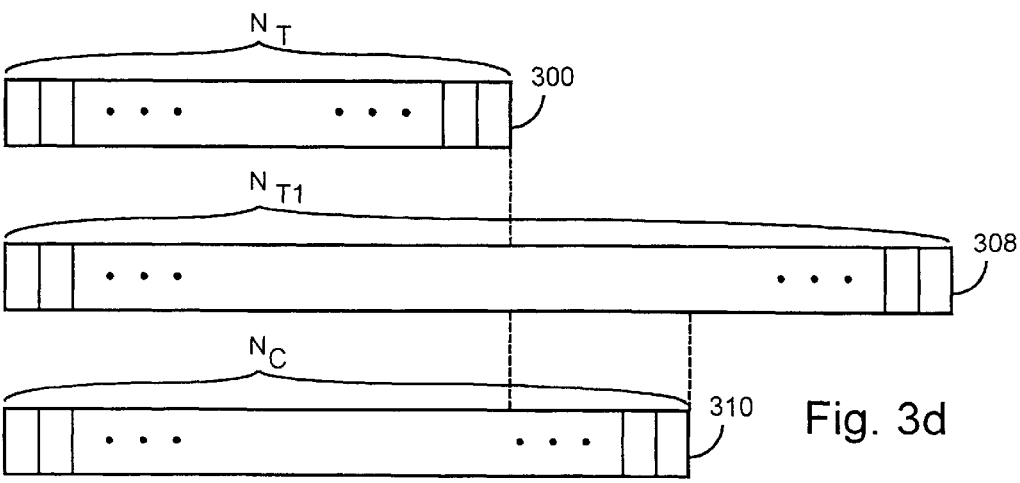

In the example of FIG. 3d, the channel data rate $N_T$ is lower than the information data rate $N_C$, such that $$\frac{N_C - N_T}{N_C} < A,$$

wherein A is a predetermined positive constant from (0,1). A may be for example 0.2. FIG. 3d shows a frame 310 of a data source and two frames 300, 308 of different lengths that are used in the system and that contain $N_T$ and $N_{T1}$ symbols, such that $N_T < N_{T1}$. In a preferred embodiment of the invention, when the data rate of the data source exceeds the corresponding data rate of the smaller frame by a predetermined threshold, the adaptation is carried out by selecting for signal transmission the larger frame, which is subjected to repetition coding. In the example of FIG. 3d, the symbols in the frame 310 of the data source are not transmitted through puncturing in the shorter frame 300, but the larger frame 308 is selected for use and the repetition coding is executed with the method described above. In this manner it is possible to avoid a large number of removals that might deteriorate the signal quality. Another alternative in the situation of FIG. 3d is to divide the symbols in the frame 310 of the data source into two smaller frames 300 where the repetition coding according to the invention is carried out.

Figure 4:
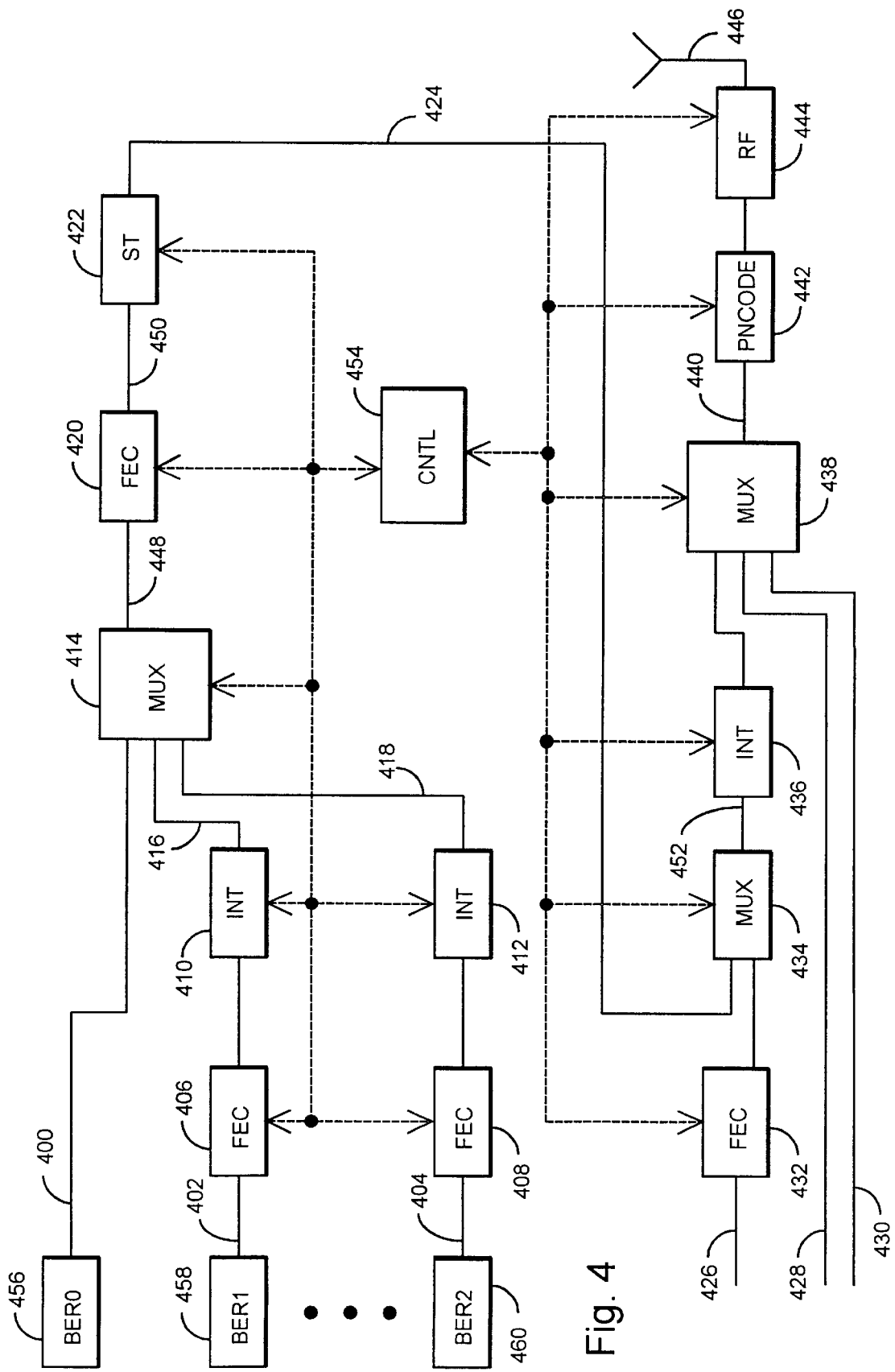
FIG. 4 is a block diagram illustrating the structure of another transmitter according to the invention.

FIG. 4 is a block diagram illustrating a possible structure of a transmitter implementing the arrangement according to the invention. The transmitter used as an example in the figure utilizes the CDMA multiple access method, but the idea of the invention can naturally also be applied in other types of transmitters. The transmitter according to the invention therefore comprises a number of data sources 456 to 460, which have output signals 400 to 404 with different quality level requirements and different data rates, and which may produce signals that are to be transmitted simultaneously. Possible data transmitters typically include a speech coder, a telefax terminal, a video coder or some other source producing digital information.

The transmitter according to the invention further comprises first coders 406, 408 for subjecting at least some of the signals to be transmitted to external coding, such that due to the coding the quality level requirement of the signals coded in this manner equals the lowest quality level requirement of the active data sources. Therefore, all the signals to be transmitted are provided with the same quality level requirement. The coding to be used can be carried out in known manners and it is preferable to use the Reed-Solomon coding method. The transmitter may also comprise first interleavers 410, 412 for interleaving the coded signals, which means that the positions of the symbols in the signal are changed according to a known algorithm.

The signals 400, 416, 418 that are obtained from all the data sources and that have thus a common quality level requirement are supplied to a multiplexer 414, wherein the signals are combined on a time domain into frames of equal length that contain bits in numbers that may vary from frame to frame, depending on the signals at the input of the multiplexer. The output of the multiplexer 414 is functionally connected to a second coder 420, where the signal is subjected to internal coding. This coder 420 may be any desired coder. The preferred embodiment utilizes a convolutional coder with which it is possible to lower the common quality level requirement.

The signal 450 coded in this manner is supplied to means 422, where the frames to be transmitted are subjected to equalization of the number of symbols, such that the length of the symbols to be transmitted in each frame equals a multiple of a known time span that is substantially shorter than the symbol length. In connection with the CDMA method, this may be a multiple of the bit length or chip length of the spreading code.

The number of the symbols can be equalized by either repeating or removing symbols in the above-described manner according to the invention. The means 422 can be preferably implemented by means of software through signal processing with a signal processor. In the means 422, the symbols of the signal are grouped into a first block the length of which corresponds to a desired equalized data rate. In the means 422, the difference between the symbols in the frame and the desired number of symbols is calculated by subtracting the desired number from the number of symbols in the first block. The difference is equalized in the means 422 by removing or repeating every ith symbol in the first block, i being determined as the nearest bigger or an equal integer when the number of symbols in the first block is divided by the difference calculated. The means 422 form the first block so that it consists of the symbols that have not been repeated or removed, and they repeat the above-described procedure until the desired number of symbols is achieved.

In the transmitter according to the invention, it is also possible to form frames of different lengths, and when the higher data rate exceeds the lower data rate by a certain threshold, a larger frame is selected for signal transmission, and repetition coding is carried out.

The transmitter according to the invention further comprises a multiplexer 434, which combines data about the frame structure of each frame, e.g. about the bit rate, to the signal frames that are to be transmitted and that contain an equal number of symbols. The data 426 concerning the frame structure is supplied first to a coder 432, where the desired coding is executed to protect the information against transmission errors, and the coded signal is supplied to the multiplexer 434. This data may comprise, for example, a description of the frame structure of the frame in question or the next frame to be transmitted. The signal 452 combined in this manner is supplied further to an interleaver 436.

The transmitter may comprise a multiplexer 438, where the interleaved signal is supplemented with additional information, such as power control data 428 or reference symbols 430 for coherent reception. When the transmitter is a CDMA transmitter, the combined signal 440 is supplied to a multiplier 442, where the signal is multiplied by a spreading code characteristic of the connection, so that the signal spreads to the entire frequency band used. The signal multiplied in this manner is supplied further to radio-frequency parts, where the signal is converted into a radio frequency and amplified for transmission by an antenna 446.

The transmitter according to the invention comprises control means 454, which control the operation of the above-described parts and which may be implemented for example by means of a microprocessor, separate logic circuits or the like. The control means 454 also provide control to the radio-frequency parts 444 concerning the transmit power of each frame to be transmitted, and this power may depend on the number of symbols in the frame after the multiplexer 414.

The transmitter according to the invention naturally also comprises other components, such as filters and converters, as it is evident for a person skilled in the art, but for the sake of clarity they are not mentioned in FIG. 4 and in the description related thereto.

Even though the invention is described above with reference to an example according to the accompanying drawings, it is clear that the invention is not restricted thereto but it can be modified in several ways within the scope of the inventive idea disclosed in the appended claims.

What is claimed is:

1. A method for converting a signal data rate from a lower data rate to a higher data rate in a digital data transmission system, the method comprising the steps of
    A1) transmitting a signal by using frames of a given length, which length corresponds to the higher data rate,
    B1) grouping the signal to a first block the length of which corresponds to the lower data rate,
    C1) subjecting symbols to be transmitted to repetition coding,
    D1) calculating the number of symbols missing from the frame by subtracting from the frame length the number of symbols in the first block, and if the number of the missing symbols is greater than one,
    E1) repeating every ith symbol of the first block, i determined as the nearest bigger or an equal integer when the number of symbols in the first block is divided by the number of symbols missing from the frame,
    F1) updating the first block by removing therefrom the symbols that have been repeated,
    G1) updating the number of symbols missing from the frame by subtracting therefrom the number of the symbols that have been repeated, and if the number of the missing symbols is greater than one,
    H1) proceeding to step E1).

2. A method for converting a signal data rate from a higher data rate to a lower data rate in a digital data transmission system, the method comprising the steps of
    A2) transmitting a signal by using frames of a given length, which length corresponds to the lower data rate,
    B2) grouping the signal to a first block the length of which corresponds to the higher data rate,
    C2) subjecting symbols to be transmitted to removal coding,
    D2) calculating the number of symbols that do not fit in the frame by subtracting the frame length from the number of symbols in the first block, and if the calculated number of symbols is greater than one,
    E2) removing every ith symbol from the first block, i being determined as the nearest bigger or an equal integer when the number of symbols in the first block is divided by the number of symbols that do not fit in the frame,
    F2) forming the first block to consist of the symbols that have not been removed,
    G2) updating the number of symbols that do not fit in the frame by subtracting therefrom the number of the removed symbols, and if the updated number of the symbols is greater than one,
    H2) proceeding to step E2).

3. A method according to claim 1, wherein, if the number of symbols missing from the frame is one after step D1), the first symbol in the block is repeated.

4. A method according to claim 1, wherein the number of the repeated symbols is determined after step E1) by determining the nearest smaller or an equal integer when the number of symbols in the block is divided by i.

5. A method according to claim 2, wherein, if the number of symbols that do not fit in the frame is one after step D2), the last symbol in the block is removed.

6. A method according to claim 2, wherein the number of the symbols that have been removed is determined after step E2) by determining the nearest smaller or an equal integer when the number of symbols in the block is divided by i.

7. A method according to claim 1, wherein frames of different lengths are used in the system, and when the higher data rate exceeds the lower data rate by a certain threshold, adaptation is carried out by selecting for signal transmission a larger frame, which is subjected to repetition coding.

8. A method according to claim 1, wherein, when the higher data rate exceeds the data rate corresponding to the smaller frame by a certain threshold, adaptation is carried out by distributing the symbols to be transmitted into several frames that are subjected to repetition coding.

9. A method according to claim 1, wherein, if the frame length is at least double the number of the symbols to be transmitted, all the symbols are repeated at least once.

10. A transmitter in a digital data transmission system, comprising means for generating a signal having a first data rate, means for forming the signal in frames of a given length that corresponds to a second data rate, means for grouping the signal in a first block the length of which corresponds to the first data rate, means for calculating the difference between the frame and the number of symbols in the first block by subtracting the frame length from the number of symbols in the first block, means for equalizing the difference by removing or repeating every ith symbol in the first block, i being determined as the nearest bigger or an equal integer when the number of symbols in the first block is divided by the absolute value of the difference that was calculated, means for updating the number of symbols that do not fit in the frame by subtracting therefrom the number of the symbols that have been repeated, or removed and means for forming the first block to consist of the symbols that have not been repeated or have not been removed.

11. A transmitter according to claim 10, wherein the means form frames of different lengths, and when the higher data rate exceeds the lower data rate by a certain threshold, the means select a larger frame for signal transmission and carry out repetition coding.

12. A transmitter according to claim 10, wherein the transmitter is a subscriber terminal in a cellular radio system.

13. A transmitter according to claim 10, wherein the transmitter is a transmitter of a base station in a cellular radio system.

14. A method for converting a digital signal comprising symbols and having a first data rate to a second data rate by either repeating symbols or by removing symbols, wherein the signal having the first data rate is grouped in a block having a length corresponding to the first date rate and the signal having the second data rate uses a frame having a length corresponding to the second data rate, comprising the steps of:

A) determining whether symbols should be repeated or removed to effect said conversion;

if symbols should be repeated then:

B) calculating the number of symbols missing from the frame on conversion and if the calculated number is greater than one;

C) repeating every ith symbol of the block, i being determined as the nearest bigger or an equal integer when the number of symbols in the block is divided by the number of symbols missing from the frame;

D) updating the block by removing therefrom the symbols that have been repeated; and E) updating the number of symbols missing from the frame and if the number of the missing symbols is greater than one, proceeding to step C), if symbols should be removed, then:

F) calculating the number of symbols that would not fit in the frame on conversion, and if the calculated number is greater than one;

G) removing every ith symbol of the block, i being determined as the nearest bigger or an equal integer when the number of symbols in the block is divided by the number of symbols which do not fit in the frame;

H) updating the block by removing therefrom the symbols that have been removed; and I) updating the number of symbols that do not fit in the frame and if the number of the missing symbols is greater than one, proceeding to step G).

15. A method for converting a digital signal comprising symbols and having a first data rate to a second higher data rate by repeating symbol wherein the signal having the first data rate is grouped in a block having a length corresponding to the first data rate and the signal having the second data rate uses a frame having a length corresponding to the second data rate, comprising the steps of:

A) calculating the number of symbols missing from the frame on conversion and if the calculated number is greater than one then;

B) repeating every ith symbol of the block, i being determined as the nearest bigger or an equal integer when the number of symbols in the block is divided by the number of symbols missing from the frame;

C) updating the block by removing therefrom the symbols that have been repeated; and D) updating the number of symbols missing from the frame and if the number of the missing symbols is greater than one, proceeding to step B).

16. A method for converting a digital signal comprising symbols and having a first data rate to a second lower data rate by removing symbols, wherein the signal having the first data rate is grouped in a block having a length corresponding to the first data rate and the signal having the second data rate uses a frame having a length corresponding to the second data rate, comprising the steps of:

A) calculating the number of symbols that do not fit in the frame on conversion, and if the calculated number is greater than one then;

B) removing every ith symbol of the block, i being determined as the nearest bigger or an equal integer when the number of symbols in the block is divided by the number of symbols which do not fit in the frame;

C) updating the block by removing therefrom the symbols that have been removed; and D) updating the number of symbols that do not fit in the frame and if the number of the missing symbols is greater than one, proceeding to step B).

17. A processor arranged to carry out the method of any one of claims 14, 15 or 16 or a transmitter or receiver having a processor arranged to carry out the method of any one of claims 14, 15 or 16.

* * * * *